ELECTROGRAPHIC RECORDING WITH MAGNETIC MATERIAL

Filed May 20, 1955

2 Sheets-Sheet 1

*INVENTORS*
HERMAN EPSTEIN
OSCAR B. STRAM

BY

Ralph K. Bonell

AGENT

ELECTROGRAPHIC RECORDING WITH MAGNETIC MATERIAL

Filed May 20, 1955 2 Sheets-Sheet 2

INVENTORS
HERMAN EPSTEIN
OSCAR B. STRAM

BY Ralph K. Bonell

AGENT 2,970,299
Patented Jan. 31, 1961

2,970,299

ELECTROGRAPHIC RECORDING WITH MAGNETIC MATERIAL

Herman Epstein, West Chester, and Oscar B. Stram, Paoli, Pa., assignors to Burroughs Corporation, Detroit, Mich., a corporation of Michigan Filed May 20, 1955, Ser. No. 509,904

23 Claims. (Cl. 340—174.1)

This invention relates to a method of and means for recording, reading and erasing indicia employed to portray information, the indicia being composed of magnetic powder electrostatically deposited on a recording medium.

In co-pending application Serial No. 443,646, filed July 15, 1954, there is disclosed a means for recording information whereby latent electrostatic images of alphameric characters are formed on the surface of a recording medium such as a paper tape by discharges between appropriate electrodes. The images are rendered visible by the application of a finely divided powder, for example dyed lycopodium powder, to the surface of the medium causing particles of the powder to adhere thereto in the image areas. By making use of a medium which has a coating of thermoplastic material the record can be fixed through the use of heat and pressure, the heat serving to soften the coating slightly and the pressure then embedding the powder particles therein.

Among the difficulties encountered in perfecting the above described process has been a tendency, due to the accumulation of random charges and to other effects, for some powder particles to adhere to the medium in non-image areas and thereby produce an undesirable background discoloration. Excess powder of this sort has in the past been removed by suitably agitating the medium, but this agitation is not easy to control and, particularly in high speed recording, is an undesirable operation. Another shortcoming of the process has been the fact that with the inking powders previously employed selective erasure of recorded material, which is a desirable feature in recording apparatus, has been impractical or impossible. Furthermore, there has been no simple means for reading the recorded information, for example, means for reading coded indicia as electrical impulses which may be utilized by electronic computers and other data processing means.

The present invention constitutes an improvement in the previously disclosed means and method of operation in that the powder used in developing the latent image is one having magnetic properties, such as finely divided iron, an iron alloy or the magnetic oxides of iron. The charged surface areas which constitute the latent image are thus not only rendered visible through adherence of the powder thereto, but are given properties which make possible the reading of the portrayed information by simple electromagnetic transducers and the selective removal of background discoloration or complete erasure of the visible image by magnetic means which apply to the powder particles a force sufficient to overcome the electrostatic attraction of the charged medium.

It is an object of the invention to provide means utilizing the electrostatic attraction between charged bodies to deposit material having magnetic properties on selected areas of a recording medium.

Another object is to provide a method of magnetic recording wherein the magnetic recording material initially is distributed and held in position on the surface of a movable base member by electrostatic forces.

Another object is to provide improved means for making a magnetic record which includes magnetic means for erasing selected portions of the record by removing therefrom the magnetic recording material.

Another object is to provide magnetic means for selectively affecting magnetic particles held to the surface of a recording medium by electrostatic forces, for partial or complete removal of the particles from the medium.

Another object is to provide improved means for and methods of recording and reading data which make use of a record comprising discrete areas of magnetizable material deposited in selected positions on the record in accordance with the values of the data.

Other objects will hereinafter appear.

In the figures, Fig. 1 is a front view of recording and playback apparatus in accordance with the principles of the invention, showing certain electrical circuits connected thereto;

Figure 1:
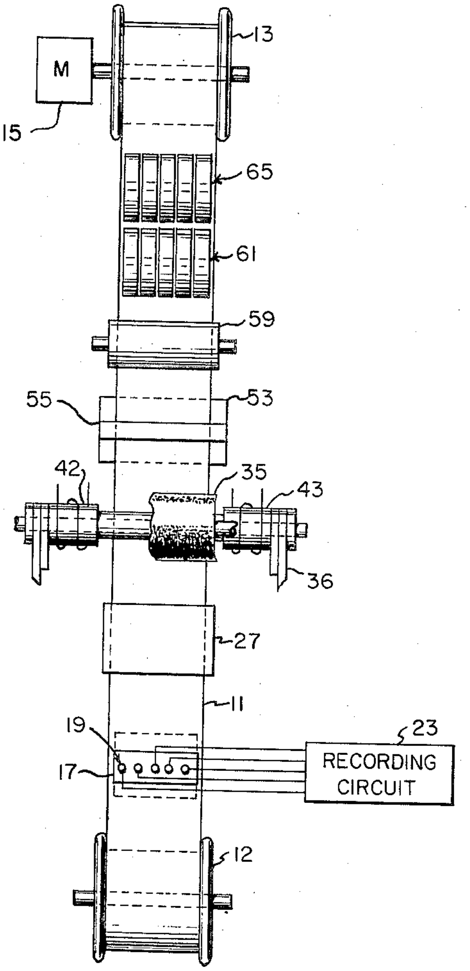
Figure 4B:
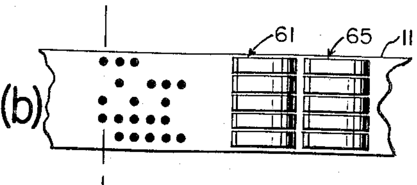
Figure 4A:
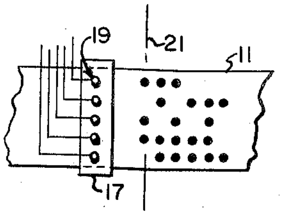
Figure 7:
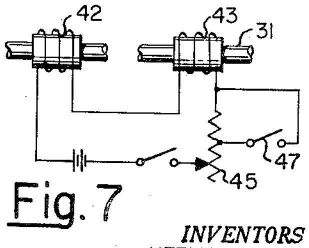
Figure 3:
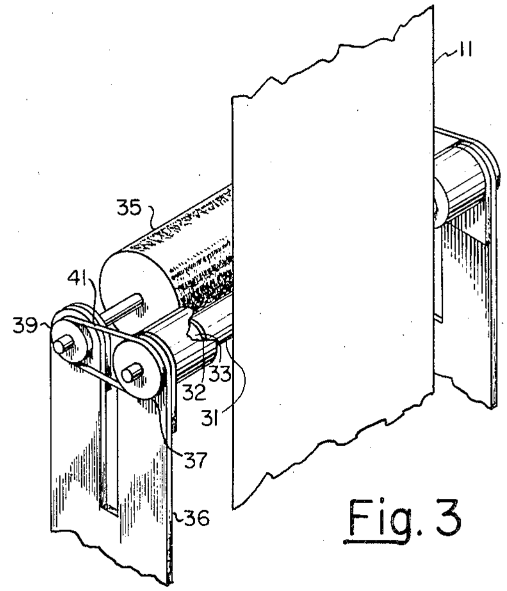
Fig. 3 is a detail of Fig. 1 to an enlarged scale, shown in perspective.
Figure 5:
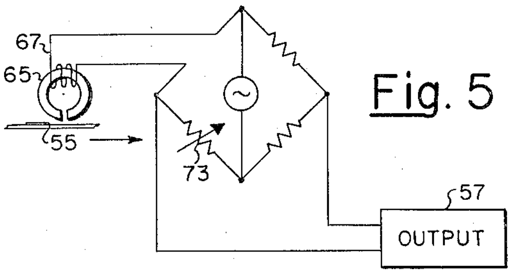
Figure 8:
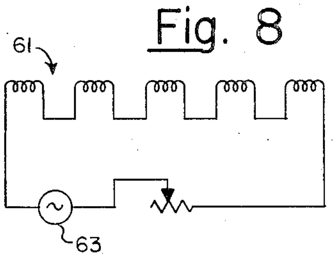
Figure 6:
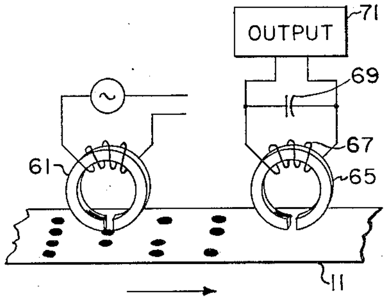

Figs. 4(*a*) and 4(*b*) are views showing assemblies of a portion of a recording tape with recording, and with magnetizing and playback heads, respectively;

Fig. 5 is a circuit diagram illustrating one method of reading or playing back the record of Fig. 4;

Fig. 6 is a perspective view of a record tape together with magnetizing and playback heads and showing certain electrical circuits connected thereto;

Fig. 7 is a wiring diagram including the magnetic erasing means of Fig. 1;

Fig. 8 is a wiring diagram including the magnetizing heads of Fig. 1; and

Figure 9:
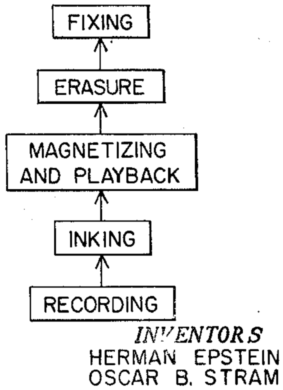

Fig. 9 is a flow diagram of a recording process which is a modification of the operation of the apparatus of Fig. 1.

Figure 2:
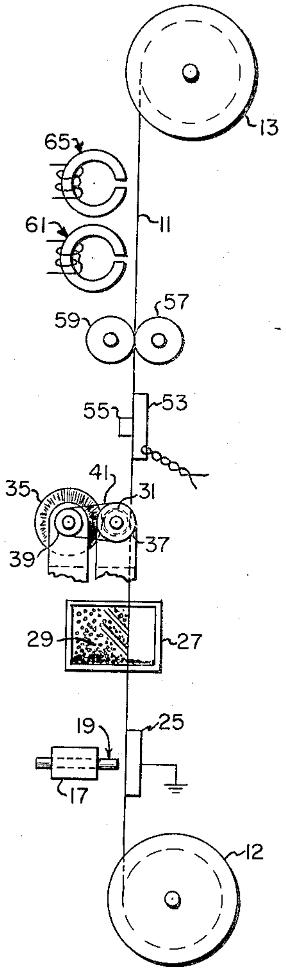
Fig. 2 is an end view of the apparatus of Fig. 1.

Referring now more particularly to Figs. 1 and 2, there is shown a recording medium 11 such as a paper tape capable of retaining electrostatic charges, together with storage reel 12 and take up reel 13 therefor between which the tape is transported by suitable driving means, as motor 15. After leaving reel 12, tape 11 passes beneath recording head 17 mounting a plurality of recording electrodes 19 suitably arranged for printing desired indicia when electrical discharges are produced therefrom. In Fig. 4(*a*) recording head 17 is shown as mounting five recording electrodes 19 in spaced alignment laterally of tape 11. This illustrates an arrangement for printing coded characters according to a five dot code, such as the character along axis 21 which includes three of the possible five dots. The invention, however, is not limited to data representation in this manner. For example, in application Serial No. 443,646 means are disclosed for exciting a recording head having linearly aligned electrodes in a manner suitable for the printing of letters and figures and similar means may be used to excite the head of Fig. 4(*a*). In describing, herein, means for practicing the present invention only the writing and playback of dot-encoded data characters will be considered.

Electrodes 19 are energized for printing from recording circuit 23 which may comprise features disclosed in said application Serial No. 443,646, including means for applying a steady electrical bias to the electrodes, so that the actual printing impulses need supply only an incremental voltage to achieve the required printing potential. On the opposite side of tape 11 from recording head 17 there is positioned a ground electrode 25, co-extensive with the recording electrode array, which may also serve as a guide for the tape.

In printing a dot of an encoded character the selected recording electrode 19 is charged to a negative potential of relatively high amplitude, for example, 1000 volts, relative to electrode 25 by the combined means of circuit 23 thereby causing a discharge between the electrodes 19 and 25. In the process, the surface of tape 11 immediately below the recording electrode acquires a charge over an area roughly corresponding to the sectional area of the electrode. An exact image of the electrode is unnecessary, it being sufficient merely to produce a spot which can be reliably sensed by the reading means employed. The paper bearing the latent images of the recorded dots passes through developing chamber 27 which contains a finely divided powder 29 of magnetic material. This material may have either low or high magnetic remanence, that is, it may be either "soft" or "hard," magnetically. Though electrostatic attraction, particles of the powder in chamber 27 adhere to the charged surface areas of the tape to render the latent image visible.

Because of random charges on the surface of tape 11 not connected with the recording process, and due to other attractive forces, certain of the powder particles 29 tend to adhere to the tape in non-image areas. To free the tape from this background discoloration it is caused to pass beneath magnetized roller 31 which may either be in actual contact with the tape or, preferably, spaced slightly therefrom. Roller 31 comprises a core 32 of soft magnetic material having a thin surface coating 33 of non-magnetic material such as copper or brass. Bearing against a portion of the periphery of roller 31 remote from tape 11 is a rotatably mounted cleaning brush 35. Both roller and brush are rotated continuously either through engagement of the roller with tape 11 or, preferably, by a driving connection (not shown) to pulleys 37 and 39, connected by belt 41. The peripheral displacements of roller 31 and brush 35, where they are in contact, are caused to be opposite in direction and the resultant relative velocity of sufficient magnitude so that adequate rubbing action occurs.

Core 32 of roller 31 is magnetized by electromagnets 42 and 43 so polarized that the portion of the core therebetween becomes a salient pole. A tendency is thus created for magnetic powder particles on tape 11 to be attracted to roller 31 and held thereto. By adjustment of the excitation of the magnets, as by means of rheostat 45 shown in the circuit diagram of Fig. 7, the magnetic force exerted by roller 31 can be caused to remove only the loosely held particles making up the background discoloration, without disturbing the image particles, or to remove all powder from the surface of the tape, thereby erasing the visible image before it becomes fixed. A portion of the resistance of rheostat 45 may be arranged to be short-circuited by key 47 to provide for a readily controllable transition from normal operation, with background powder removal, only, to an erasing condition. While D.C. excitation of magnets 41 and 43 is illustrated in Fig. 7, A.C. excitation may be used. This is particularly effective in securing clean erasure of undesired recorded material.

As roller 31 rotates, the powder adhering thereto is brought under brush 35 which sweeps it from the surface of the roller. Non-magnetic surface coating 33 facilitates this procedure by preventing the sticking which occurs when two magnetized bodies are in direct surface contact.

After passing beneath roller 31 tape 11 passes over heated platen 53 against which it is pressed by bar 55. It then passes between squeeze rollers 57, 59. If tape 11 is provided with a thermoplastic coating on the recording surface, as has been referred to hereinbefore, the heat of platen 53 softens this coating to a sufficient degree so that later passage between rollers 57, 59 causes the powder particles adhering to the surface of the tape to be pressed into the coating which on cooling then holds them firmly, to provide a "fixed" image. Instead of being present on the surface of the tape, thermoplastic material may be incorporated in the inking powder so that when softened by heat it causes the powder to stick to the tape.

In passing over heated platen 53 the charge which constitutes the latent electrostatic image is dispersed, thus completing the erasing process initiated by the destruction of the visible image through physical removal of the powder particles from the image areas. This prevents redevelopment of the image through later adherence of dust or other particles to the medium in such areas.

The means thus far described provide for the selection of discrete areas of the recording medium in accordance with a predetermined signal code and for the non-magnetic alteration of the character of the areas by causing them to become electrostatically charged, followed by the transformation of the electrostatically defined areas into areas of magnetic material each completely bounded by non-magnetic material. The portions of the medium available for magnetization thus are completely determined before magnetization occurs.

After fixing, the tape passes beneath magnetizing heads 61, the five heads shown in Figs. 1 and 4(*b*) being individual to the five code channels, or lateral positions in which data dots may occur in the type of recording referred to herein for illustrative purposes. It has been noted that the recorded dots may comprise either hard or soft magnetic material, that is, they may be respectively capable or incapable of retaining magnetism. Heads 61 function only in the former case. In such case their windings may, as a matter of choice, be excited with either direct or alternating current. Direct current excitation produces substantially uniform magnetization of a dot in the direction of its travel while alternating current magnetization provdes magnetization varying sinusoidally in that direction. In Fig. 8, A.C. generator 63 is shown as the means for energizing heads 61. In order to reach a steady state response in the reading of an A.C. magnetized dot, a minimum of about 10 cycles of magnetization should be recorded thereon. The factors affecting the number of cycles recorded and their spacing are: the frequency of the supply, the dot size, and its rate of displacement. In reading, the factors determining the reproduced signal frequency are the spacing of the recorded magnetic cycles on a dot and the rate of displacement of the dot.

The tape bearing "fixed" coded characters in the form of either magnetized or unmagnetized dots is, for reading purposes, passed beneath reading or playback heads 65, one such head being furnished for each code channel to sense the occurrences of dots in that channel. When A.C. magnetization of the dots is employed, the circuit of Fig. 6 shows preferred connections for a reading head. Here winding 67 of head 65 is tuned by condenser 69 to the frequency defined by the spacing of successive cycles of magnetization along a dot in the direction of its displacement and the rate of such displacement, the latter being the driven speed of the tape. By the use of such a resonant circuit a relatively high amplitude response is obtained for application to utilization circuit 71.

When a data dot is magnetized by the application of direct current, instead of alternating current, to the windings of heads 61, the position of the magnetized spot may be sensed in conventional manner by the generation of a voltage in the winding of a head 65, responsive to rate of change of flux, upon passage of the dot thereby. For sensing the occurrence of an unmagnetized dot, the change of reluctance which occurs when the dot passes a gap in the magnetic circuit of a reading head may be utilized. Fig. 5 shows a diagram of a conventional bridge circuit for detecting such a change of reluctance. The winding 67 of head 65 in this case is connected in one arm of the bridge which is balanced by suitable adjustment of variable impedance 73, the other two arms of the bridge being the usual ratio arm resistances.

The order in which the several described means operate to perform the functions including recording, inking, erasure, fixing and playback, may be varied, within limits, to suit conditions. The arrangement of Fig. 1 is by way of illustration, only, of one sequence of operations which affords an opportunity to describe in detail the elements of the recording apparatus. These elements may be rearranged, for example, to operate according to the process illustrated by the flow diagram of Fig. 9. In apparatus thus arranged the recording function may be performed by head 17, inking by means 27, magnetizing and playback by heads 61 and 65, respectively, erasure by means 31, 35 and fixing by platen 53, all shown in Fig. 1. This sequence of operations permits a record to be monitored and portions thereof erased, if desired, before the record is made permanent by fixing.

Reading of the record after fixing to supply electrical impulses to computing or other apparatus may, of course, occur in apparatus physically separated from the recording apparatus, the latter retaining, if desired, the playback facilities for checking and editing the record.

Thus, in the described arrangements there have been disclosed means for electrostatically determining the distribution of areas of magnetic material carrying encoded information, for selectively erasing portions of a record thus made, for enhancing the contrast between record and background by reducing or removing background discoloration and for playing back the record. The invention is not limited to the specific means disclosed herein for performing these functions or to the described operation thereof. The limits of the invention are defined, solely, in the appended claims.

What is claimed is:

1. In magnetic recording apparatus providing writing, erasing and playback facilities the combination of a base member in the form of an elongated longitudinally displaceable sheet having a high surface electrical resistivity, displacing means therefor, displacement of said member causing a particular portion thereof to pass by recording, inking, cleaning, fixing and playback means for cooperation therewith, said recording means comprising electrodes each having a portion thereof positioned closely adjacent the surface of the base member together with means for exciting selected ones of the electrodes to produce electrical discharges causing discrete areas of the surface of said member corresponding in position thereto to acquire electrostatic charges constituting a latent image, said inking means comprising magnetic material in finely powdered form together with means for applying said material to the surface of the base member to develop the latent image through electrostatic adherence of particles of the powder to the member over the charged image areas, said cleaning means comprising means for producing a magnetic field adapted to act on powder particles on the surface of the base member to selectively remove particles held thereto by forces of less than a preselected magnitude, said fixing means comprising means causing greater adherence to the base member of powdered material in an image area than that provided by the initial electrostatic attraction in said area and said playback means comprising means for generating electrical impulses responsive to the passage thereby and to the magnetic condition of said areas of magnetic material.

2. The combination defined in claim 1 wherein said magnetic material has substantial magnetic remanence and means are provided for imparting a selected pattern of magnetization thereto in said image areas prior to passage past said playback means.

3. The combination defined in claim 2 wherein said pattern of magnetization is one varying sinusoidally over said areas in the direction of displacement of the base member and said playback means includes a signal-responsive circuit adapted to be tuned to a frequency corresponding to the time rate of variation of the magnetization constituting said pattern as said areas are displaced past said playback means.

4. The combination defined in claim 3 wherein said playback means includes an electromagnetic transducer comprising a magnetic circuit having an air gap and a winding linked with said circuit having inductance, together with capacitor means for annulling the reactance of said winding at said frequency.

5. The combination defined in claim 1 wherein the electrodes of said recording means are arranged for the production of a latent electrostatic image comprising a plurality of dots in selected relationship, for recording information according to a preselected code.

6. The combination claimed in claim 1 wherein said base member is constituted by a paper sheet having a coating of thermoplastic material and said fixing means includes sequentially operable means for softening said coating and for causing particles of said powder to become embedded therein.

7. In recording apparatus the combination of a medium having a high surface electrical resistivity, means for recording information as a pattern of electrostatically charged areas of the surface thereof, means for depositing finely divided magnetic material over said areas, said material being then bound to the medium by electrostatic force, and means for selectively creating a magnetic field adapted to overcome said force and to remove said material from said areas, for erasing the magnetic image formed thereby.

8. In recording apparatus the combination of a medium having a high surface electrical resistivity, means for recording information as a pattern of electrostatically charged areas of the surface thereof, means for depositing magnetic material in the form of a finely divided powder on said surface, particles of said material being relatively firmly bound by electrostatic forces to said surface over said charged areas thereof and relatively loosely bound to said surface in other areas, and means for creating a magnetic field at said surface effective to remove said loosely bound magnetic particles therefrom but ineffective to remove said firmly bound particles.

9. In recording apparatus the combination of a recording medium having a high surface electrical resistivity, means for recording information thereupon as a pattern of electrostatically charged areas of a surface thereof, means for applying magnetic material in the form of a finely divided powder to said surface, particles of said material thereby being bound to the medium over said areas by electrostatic force, means for creating a magnetic field at said surface effective to overcome said electrostatic force and remove from the surface of the medium particles thus bound, and subsequently operable means for dissipating the electrostatic charge of said areas to prevent the re-adherence of material particles thereto by electrostatic attraction.

10. The combination defined in claim 9 wherein said recording medium comprises a paper base having a coating of thermoplastic material.

11. The combination defined in claim 10 wherein the means for dissipating the electrostatic charge comprises a heater operable to cause incipient softening of said thermoplastic coating.

12. In means for making and editing a magnetic record the combination of a base member adapted to retain an electrostatic charge over discrete areas of the surface thereof at normal temperatures, said charge being dissipated at elevated temperatures, means for producing a latent electrostatic image characteristic of information to be recorded comprising a pattern of discrete charged areas of said surface, means for imparting magnetic properties to said image including means for depositing magnetic material over said areas in a finely divided state adapted to be bound to the base member by the electrostatic field of the latent image, electromagnetic means excitable to create a magnetic field adapted to overcome the attraction on said material of said electrostatic field, thereby to remove portions of the material representing undesired information, for editing purposes, and means for heating said base member to a temperature suitable to dissipate the charge of the latent image and complete erasure of the undesired information.

13. In apparatus for producing a record of variable data in the form of discrete visible magnetized dot-shaped areas of magnetic material superimposed on a base member and arranged thereon in patterns representative of the data, the combination of a base member capable of retaining electrostatic charges, means for successively passing said member past a recording, an inking, a fixing and a magnetizing station, means at said recording station for producing an initial version of the record in the form of invisible electrostatically charged areas corresponding in form and position to the intended visible areas of said superimposed material, means at said inking station for bringing finely powered high remanence magnetic material under the influence of said charged areas for superimposition on the medium over said areas through the agency of electrostatic attraction, means at said fixing station for binding the magnetic material retained in said charged areas to the medium by a force greater than said electrostatic attraction, and means at said magnetizing station for magnetizing the magnetic material thus bound to the medium according to a pattern of magnetization cyclically variable over said areas.

14. The combinaion defined in claim 13 which further includes means operating intermediate the passage of said member past said inking and fixing stations, respectively, to remove particles of said magnetic material in areas not comprised by said patterns.

15. In data recording and reproduction apparatus the combination of a record sheet capable of retaining electrostatic charges, means for advancing said sheet in uninterrupted succession and at a constant speed past recording and read-out means, respectively, said recording means comprising means for electrostatically depositing powdered magnetic material on said sheet in patterns of discrete dots representative of the data and means for magnetizing said dots according to a pattern cyclically repeated at a uniform rate in the direction of displacement of the sheet, said read-out means comprising means for generating alternating electrical signals responsive to the passage of the thus magnetized dots thereby and being characterized by a maximum response at the frequency of alternation of said signals.

16. In apparatus for making and reading a magnetic record of coded signals the combination of a recording medium comprising in sheet form non-magnetic material capable of retaining electrostatic charges, means for electrostatically charging said medium over discrete areas thereof aligned in spaced apart parallel rows corresponding, respectively, to a plurality of signal channels, means for depositing magnetic material on the medium over said charged areas responsive to the attractive forces thereof, said deposited magnetic material being completely surrounded by non-magnetic material, means for transporting the medium in the direction of said rows, and means for sensing the passage of the areas of magnetic material in each row as a sequence of electric signals.

17. In means for making a magnetic record of coded signals the combination of a recording medium of non-magnetic material in sheet form, means for effecting a non-magnetic alteration of the condition of said medium over discrete areas thereof in accordance with a signal pattern to be recorded and later magnetically defined, means for depositing magnetically retentive material on the medium over said areas thereof responsive to the altered condition thereof to form magnetizable areas of the medium each completely bounded by non-magnetizable areas, and means for magnetizing said magnetizable areas.

18. In recording apparatus, the combination of a recording medium having a surface of high electrical resistivity, means for recording information on said surface of the recording medium as a pattern of latent electrostatically charged areas thereof, means for depositing an inking material including a magnetic ingredient over said area, said inking material being then bound to the recording medium by electrostatic force, and means for magnetizing the magnetic ingredient of the inking material thus deposited upon said recording medium.

19. In recording apparatus, the combination of a medium having a surface of high electrical resistivity, means for recording information in the form of latent electrostatically charged areas of said surface thereof, means for depositing a finely divided powder on said surface so as to cause the electrostatic force of such charged areas to attract and retain the powder and thereby render the charged areas visible, said powder including an ingredient having a substantial magnetic remanence, and means for magnetizing the magnetic ingredient of the powder thus deposited to enable the recording medium to be sensed by magnetic sensing means.

20. In apparatus for making and reading a magnetic record, the combination of a recording medium of non-magnetic material in sheet form, means for electrostatically charging discrete areas of the recording medium in accordance with a signal pattern, means for subjecting the electrostatically charged recording medium to a supply of ink particles to place the same under the influence of the attractive forces of the charged areas thereof, the ink particles being bound to the recording medium over said areas by electrostatic force and thus rendering such areas visible, said particles including magnetically retentive material having a substantially high magnetic remanence and rendering the charged areas of the recording medium not only visible but capable of being sensed by magnetic reading means.

21. In means for making a magnetic record of coded signals the combination of: a recording medium of non-magnetic material in sheet form; means for effecting a non-magnetic alteration of the condition of said medium over discrete areas thereof in accordance with a signal pattern to be recorded and later magnetically defined, said means comprising means for electrostatically charging the medium over said areas; means for depositing magnetically retentive material on the medium over said areas thereof responsive to the altered condition thereof to form magnetizable areas of the medium each completely bounded by non-magnetizable areas, the last means comprising a supply of particles of such material in proximity to said charged areas to place the particles under the influence of the attractive forces of said areas; and means for magnetizing said magnetizable areas.

22. In recording apparatus, the combination of a recording medium in sheet form having at least a surface portion thereof of non-magnetic material, means for electrostatically charging discrete areas of said surface portion of the recording medium in accordance with a signal pattern, means for subjecting the electrostatically charged surface portion of the recording to a supply of ink particles to place the same under the influence of the attractive forces of the charged areas thereof, the ink particles being bound to said surface portion of the recording medium over said areas by electrostatic force and thus rendering such areas visible, said particles including magnetizable material and rendering the charged areas of the recording medium not only visible but capable of being magnetized for subsequent sensing by magnetic reading means.

23. In apparatus for making a magnetically detectable record of coded signals, the combination of a recording medium of non-magnetic material in sheet form, means for establishing at discrete areas of a surface of the said medium a non-magnetic force field in accordance with a signal pattern to be recorded and later to be detected by magnetic transducing or sensing means, means for depositing magnetically detectable material on the medium over said areas thereof responsive to the force field of said discrete areas to form magnetizable areas on said surface of the medium each completely bounded by non-magnetizable areas, and means for magnetizing said magnetizable areas.

References Cited in the file of this patent

UNITED STATES PATENTS

| | | |
|---|---|---|
| 2,540,654 | Cohen et al. | Feb. 6, 1951 |
| 2,685,409 | English et al. | Aug. 3, 1954 |
| 2,686,100 | Eckert et al. | Aug. 10, 1954 |
| 2,698,875 | Greenwood | Jan. 4, 1955 |
| 2,710,396 | Harris | June 7, 1955 |
| 2,714,202 | Downing | July 26, 1955 |
| 2,736,770 | McNaney | Feb. 28, 1956 |
| 2,781,972 | Chaimowicz | Feb. 19, 1957 |
| 2,784,392 | Chaimowicz | Mar. 5, 1957 |
| 2,803,758 | Whitenack | Aug. 20, 1957 |
| 2,804,506 | Schurch et al. | Aug. 27, 1957 |
| 2,846,333 | Wilson | Aug. 5, 1958 |
| 2,857,290 | Bolton | Oct. 21, 1958 |

OTHER REFERENCES

"Ferro Magnetography - High - Speed Printing With Shaped Magnetic Fields" (Berry et al.), General Electric Review, July 1952, pp. 20–22 and 61.